(12) United States Patent
Volny et al.

(10) Patent No.: US 11,046,444 B2
(45) Date of Patent: Jun. 29, 2021

(54) INFLATABLE HEAD RESTRAINT FOR PARACHUTES

(71) Applicant: GOODRICH CORPORATION, Charlotte, NC (US)

(72) Inventors: Jaro S. Volny, Scottsdale, AZ (US); Kassidy L. Carson, Colorado Springs, CO (US); Scott R. Patterson, Manitou Springs, CO (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 388 days.

(21) Appl. No.: 16/138,216

(22) Filed: Sep. 21, 2018

(65) Prior Publication Data

US 2020/0094973 A1 Mar. 26, 2020

(51) Int. Cl.
| | | |
|---|---|---|
| *B64D 25/02* | (2006.01) | |
| *B64D 17/30* | (2006.01) | |
| *B64D 25/10* | (2006.01) | |

(52) U.S. Cl.
CPC ............ *B64D 25/02* (2013.01); *B64D 17/30* (2013.01); *B64D 25/10* (2013.01); *B64D 2201/00* (2013.01)

(58) Field of Classification Search
CPC ........ B64D 25/02; B64D 25/10; B64D 25/04; B64D 17/30; B64D 2201/00
See application file for complete search history.

(56) References Cited

U.S. PATENT DOCUMENTS

| | | | | |
|---|---|---|---|---|
| 1,640,270 | A | * 8/1927 | Furman | B64D 10/00 244/143 |
| 2,708,083 | A | 5/1955 | Martin | |
| 3,372,893 | A | * 3/1968 | Larsen | B64C 3/30 244/138 R |
| 3,498,565 | A | 3/1970 | Stephens | |
| 3,768,761 | A | * 10/1973 | Cramer | B63C 9/02 244/138 R |
| 3,841,590 | A | 10/1974 | Valentine | |
| 3,921,944 | A | * 11/1975 | Morrison | B64D 1/14 244/138 R |
| 4,399,969 | A | 8/1983 | Gargano | |
| 4,466,662 | A | 8/1984 | McDonald | |

(Continued)

FOREIGN PATENT DOCUMENTS

| | | |
|---|---|---|
| DE | 4334743 | 10/1994 |
| FR | 2750395 | 10/1998 |

(Continued)

OTHER PUBLICATIONS

USPTO, Pre-Interview First Office Action dated Oct. 30, 2020 in U.S. Appl. No. 16/138,014.

(Continued)

*Primary Examiner* — Brian M O'Hara
(74) *Attorney, Agent, or Firm* — Snell & Wilmer L.L.P.

(57) ABSTRACT

An inflatable head restraint system for a parachute assembly may comprise an inflatable volume configured to inflate in response to a deployment of the parachute assembly. The inflatable volume may be located between a left shoulder riser and a right shoulder riser of the parachute assembly. A conduit may be fluidly coupled to the inflatable volume.

16 Claims, 5 Drawing Sheets

(56) References Cited

U.S. PATENT DOCUMENTS

| | | | |
|---|---|---|---|
| 4,637,577 A | 1/1987 | Miseyko | |
| 4,687,160 A | 8/1987 | Logemann | |
| 4,850,554 A | 7/1989 | Strong | |
| 4,923,147 A | 5/1990 | Adams et al. | |
| 5,039,035 A * | 8/1991 | Fitzpatrick | A42B 3/0486 |
| | | | 244/122 AG |
| 5,301,903 A | 4/1994 | Aronne | |
| 6,708,927 B2 * | 3/2004 | Chen | A62B 1/22 |
| | | | 182/230 |
| 7,703,152 B2 | 4/2010 | Rhodes et al. | |
| 9,038,948 B2 * | 5/2015 | Ruff | B64D 25/10 |
| | | | 244/122 AG |
| 9,924,755 B2 | 3/2018 | Margetis | |
| 2004/0182644 A1 | 9/2004 | Kotarski | |
| 2012/0012421 A1 | 1/2012 | Morgan | |
| 2013/0092796 A1 * | 4/2013 | Weinel | A45F 3/10 |
| | | | 244/149 |
| 2017/0106987 A1 | 4/2017 | Adams et al. | |
| 2017/0349292 A1 | 12/2017 | Adams et al. | |
| 2020/0094972 A1 | 3/2020 | Volney et al. | |
| 2020/0094973 A1 | 3/2020 | Volney et al. | |
| 2020/0094974 A1 | 3/2020 | Volney et al. | |
| 2020/0094975 A1 | 3/2020 | Volney et al. | |

FOREIGN PATENT DOCUMENTS

| | | |
|---|---|---|
| RU | 2621133 | 5/2017 |
| RU | 2624122 | 6/2017 |

OTHER PUBLICATIONS

USPTO, Notice of Allowance dated Nov. 12, 2020 in U.S. Appl. No. 16/138,415.

USPTO, Pre-Interview First Office Action dated Sep. 14, 2020 in U.S. Appl. No. 16/138,415.

USPTO, Pre-Interview First Office Action dated Dec. 21, 2020 in U.S. Appl. No. 16/138,336.

* cited by examiner

INFLATABLE HEAD RESTRAINT FOR PARACHUTES

FIELD

The present disclosure relates to parachute assemblies, and more specifically, to parachute assemblies having an inflatable head restraint.

BACKGROUND

Ejection seats are designed to eject pilots from an aircraft, with the pilot oriented in an generally upright, sitting position. Conventionally, the pilot is released from the ejection seat in response to a main canopy of the ejection seat's parachute assembly deploying. As the canopy catches wind, the pilot may be rotated to orient the pilot in the direction of canopy line stretch. As the pilot is rotated in-line with the force provided by the canopy, there is an increased risk of neck hyperextension and injury due to the pilot's head being forced rearward by the change in angular momentum.

SUMMARY

An inflatable head restraint system for a parachute assembly is disclosed herein. In accordance with various embodiments, the inflatable head restraint system may comprise an inflatable volume configured to inflate in response to a deployment of the parachute assembly, and a first conduit fluidly coupled to the inflatable volume. The inflatable volume may be located between a left shoulder riser and a right shoulder riser of the parachute assembly.

In various embodiments, a charge tank may be fluidly coupled to the first conduit and configured to output a gas. A valve fluidly may be coupled to the charge tank. The valve may be configured to actuate to an open position in response to the deployment of the parachute assembly. In various embodiments, the inflatable volume may comprise a U-shape having a transverse section extending between a pair of rearward extending sections.

In various embodiments, the inflatable volume may comprise a wedge shape having a first height at a first end of the inflatable volume and a second height greater than the first height at a second end of the inflatable volume opposite the first end.

In various embodiments, a first one-way valve may be fluidly coupled to the first conduit and to a first input of the inflatable volume. In various embodiments, a second conduit fluidly may be coupled to the inflatable volume, and a second one-way valve fluidly may be coupled to the second conduit and to a second input of the inflatable volume.

A parachute assembly is also disclosed herein. In accordance with embodiments, the parachute assembly may comprise a canopy, a first suspension line coupled to the canopy, a first riser coupled to the first suspension line, and an inflatable head restraint coupled to the first riser.

In various embodiments, the inflatable head restraint may be configured to inflate upon a deployment of the parachute assembly. In various embodiments, a charge tank may be fluidly coupled to the inflatable head restraint.

In various embodiments, the charge tank may be configured to supply gas to the inflatable head restraint in response to a tension of first suspension line exceeding a threshold tension. In various embodiments, a second suspension line may be coupled to the canopy, and a second riser may be coupled to the second suspension line. The inflatable head restraint may be coupled to the second riser.

In various embodiments, the inflatable head restraint may comprise a first portion extending rearward from the first riser, a second portion extending rearward from the second riser, and a transverse portion extending between the first portion and the second portion.

In various embodiments, a conduit may be coupled to the inflatable head restraint and to the first riser. A one-way valve may be located between an inlet of the conduit and the inflatable head restraint. In various embodiments, the inflatable head restraint may comprise a wedge shape.

As disclosed herein, in accordance with various embodiments, a parachute assembly for decelerating an occupant of an evacuation seat may comprise a left shoulder riser attachable to a harness, a right shoulder riser attachable to the harness, and an inflatable head restraint located between the right shoulder riser and the left shoulder riser.

In various embodiments, a charge tank may be fluidly coupled to the inflatable head restraint. The charge tank may be configured to supply gas to the inflatable head restraint in response to a deployment of the parachute assembly.

In various embodiments, the inflatable head restraint may comprise a first portion extending rearward from the left shoulder riser, a second portion extending rearward from the right shoulder riser, and a transverse portion extending between the first portion and the second portion. In various embodiments, the inflatable head restraint may comprise a wedge shape.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
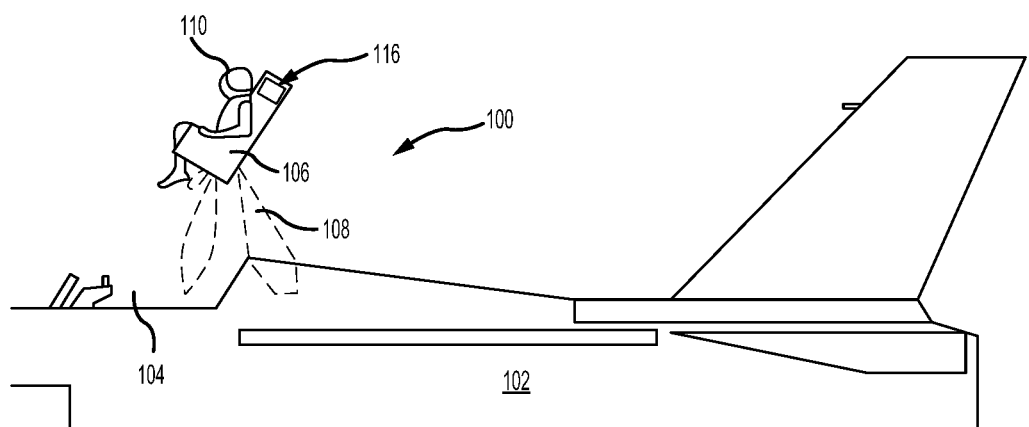
FIG. 1 illustrates an ejection seat being launched from an aircraft cockpit, in accordance with various embodiments.

In various embodiments, and with reference to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
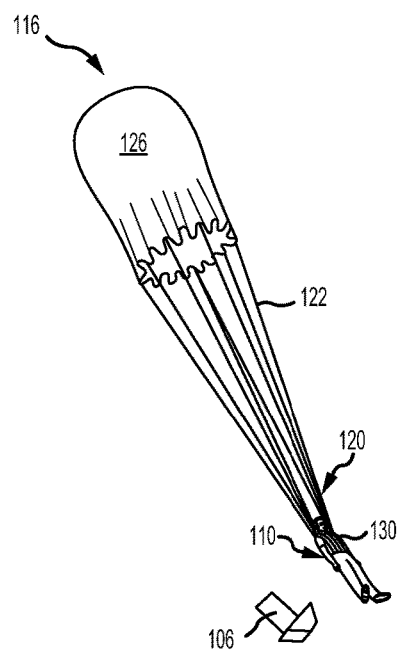
FIG. 2 illustrates a perspective view of a parachute assembly in a deployed state after separation of the occupant from the ejection seat, in accordance with various embodiments.

With reference to FIG. 2, parachute assembly 116 is illustrated in a deployed state, in accordance with various embodiments. Parachute assembly 116 may be used to increase a drag of, or otherwise decelerate, occupant 110, in response to occupant 110 being ejected, jumped, ditched, and/or dropped (collectively, "ejected") from an aircraft. Parachute assembly 116 may be configured to deploy upon separation of occupant 110 from ejection seat 106. Stated differently, in various embodiments, deployment of parachute assembly 116 may be configured to separate occupant 110 from ejection seat 106. Parachute assembly 116 may comprise a canopy 126, suspension lines 122, and risers 120.

Upon deployment of parachute assembly 116, canopy 126 may open to increase drag, or otherwise decelerate, occupant 110. Canopy 126 may comprise any suitable type of canopy and any suitable type of material, such as, for example, canvas, silk, nylon, aramid fiber (e.g., KEVLAR®), polyethylene terephthalate, and/or the like. Suspension lines 122 may be coupled to canopy 126 using any suitable attachment technique, such as, for example, through stitching. Suspension lines 122 may be configured to at least partially stabilize deployed canopy 126. In various embodiments, suspension lines 122 may be configured to connect canopy 126 to risers 120. Suspension lines 122 and risers 120 may comprise any suitable material. For example, suspension lines 122 may comprise a tubular braided material that constricts in diameter under tension, such as, for example, nylon, aramid fiber (e.g., KEVLAR®), and/or the like. Risers 120 may comprise a webbing formed from nylon, aramid fiber (e.g., KEVLAR®), and/or the like. Risers 120 may be configured to attach to a harness 130, or other structure, configured to secure occupant 110 to risers 120. In various embodiments, parachute assembly 116 may comprise a plurality of risers 120 attached to harness 130.

Figure 3:
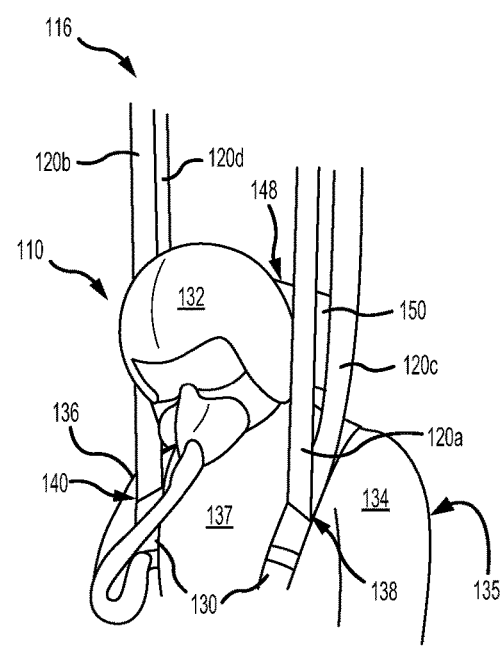
FIG. 3 illustrates a perspective view of an inflatable head restraint of a parachute assembly in a deployed state, in accordance with various embodiments.

With reference to FIG. 3, in various embodiments, parachute assembly 116 may comprise left shoulder risers 120a and 120c, and right shoulder risers 120b and 120d. Left shoulder (or first) risers 120a and 120c are attached proximate a left shoulder 134 of occupant 110 and/or are configured to be located over left shoulder 134 of occupant 110, upon deployment of parachute assembly 116. Right shoulder (or second) risers 120b and 120d are attached proximate a right shoulder 136 of occupant 110 and/or are configured to be located over right shoulder 136 of occupant 110, upon deployment of parachute assembly 116.

In various embodiments, left shoulder riser 120a is located forward of left shoulder riser 120c, and right shoulder riser 120b is located forward of right shoulder riser 120d. Stated differently, left shoulder riser 120c and right shoulder riser 120d may be located closer to a backside 135 of occupant 110 as compared, respectively, to left shoulder riser 120a and right shoulder riser 120b. As used herein, "forward" refers to the side of harness 130 configured to be attached to a front side of an occupant. Backside 135 of occupant 110 is generally opposite a front side 137 of occupant 110.

In various embodiments, left shoulder risers 120a and 120c may be attached to harness 130 at an attachment location 138, and right shoulder risers 120b and 120d may be attached to harness 130 at an attachment location 140. Attachment locations 138 and 140 are on an end of risers 120 that is opposite suspension lines 122, with momentary reference to FIG. 2. Attachment locations 138 and 140 may comprise any suitable attachment mechanism (e.g., stitching, adhesive, etc.) for securing risers 120 to harness 130. In various embodiments, and with momentary reference to FIG. 5, attachment locations 138 and 140 may each comprise a hoop, or ring, 141 attached to harness 130 and located through a loop defined by an end of risers 120. In various embodiments, each riser 120 (e.g., left shoulder riser 120a, right shoulder riser 120b, left shoulder riser 120c, right shoulder riser 120d) may have its own attachment location on harness 130.

With combined reference to FIG. 2 and FIG. 3, in various embodiments, parachute assembly 116 may comprise a greater number of suspension lines 122 as compared to the number of risers 120. For example, each riser 120 may couple to multiple suspension lines 122, such as, for example 1 to 16 suspension lines 122 per riser 120, 8 to 16 suspension lines 122 per riser 120, etc. In this regard, left shoulder riser 120a, right shoulder riser 120b, left shoulder riser 120c, and right shoulder riser 120d may each couple to its own individual set of suspension lines 122.

As canopy 126 catches wind, occupant 110 may be rotated in-line with the direction of suspension line stretch. As occupant 110 is rotated, a rearward force may be exerted on the head 132 and neck of occupant 110. As used herein, "rearward" refers to the side of harness 130 configured to be attached to a backside of an occupant supported by parachute assembly 116. In accordance with various embodiments, parachute assembly 116 may include an inflatable head restraint system 148. Inflatable head restraint system 148 includes an inflatable volume 150 (referred to herein as "inflatable head restraint" 150) configured to be located rearward of head 132 of occupant 110, upon deployment of parachute assembly 116. Inflatable head restraint 150 is configured to limit translation of head 132 in the rearward direction, thereby reducing a likelihood of head and/or neck injury to occupant 110.

Figure 4A:
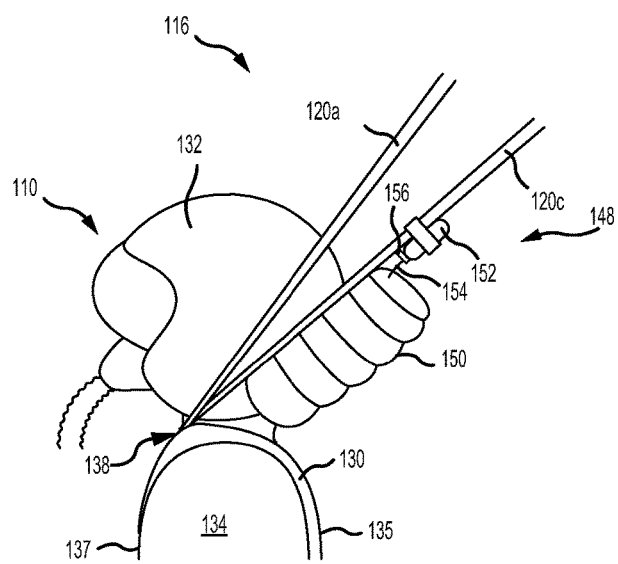
FIG. 4A illustrates a side view of an inflatable head restraint in an inflated state, in accordance with various embodiments.
Figure 4B:
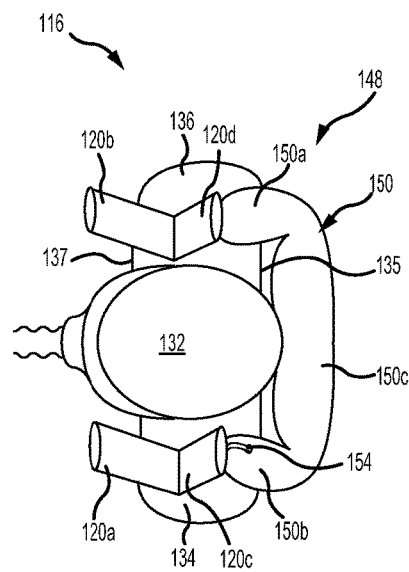
FIG. 4B illustrates downward view of the inflatable head restraint of FIG. 4A, in accordance with various embodiments.

Referring to FIGS. 4A and 4B, a side view and downward view, respectively, of inflatable head restraint 150 of inflatable head restraint system 148 for parachute assembly 116 are illustrated with inflatable head restraint 150 in an inflated state, in accordance with various embodiments. Inflatable head restraint 150 may be coupled to left shoulder riser 120c and right shoulder riser 120d. In various embodiments, inflatable head restraint system 148 of parachute assembly 116 includes a compressed fluid source, for example, charge tank 152. Charge tank 152 is fluidly coupled to inflatable head restraint 150. Charge tank 152 is configured to deliver air and/or other gas into inflatable head restraint 150, upon deployment of parachute assembly 116. In this regard, inflatable head restraint 150 may be uninflated, prior to deployment of parachute assembly 116.

Charge tank 152 may be fluidly coupled to inflatable head restraint 150 via a conduit 154. In various embodiments, charge tank 152 may be operationally coupled left shoulder riser 120c such that charge tank 152 outputs gas to inflatable head restraint 150 in response to a tension of left shoulder riser 120c exceeding a predetermined tension threshold. For example, upon deployment of parachute assembly 116, a tension in of left shoulder riser 120c may increase. The increase in tension in left shoulder riser 120c may actuate a valve 156 of charge tank 152 to an open position. Valve 156 may be fluidly coupled between an output of charge tank 152 and conduit 154. In various embodiments, the increase in tension in left shoulder riser 120c may pull a pin which, when removed (i.e., pulled), actuates valve 156 to the open position. Actuating valve 156 to the open position allows gas to flow from charge tank 152 to inflatable head restraint 150.

Figure 4C:
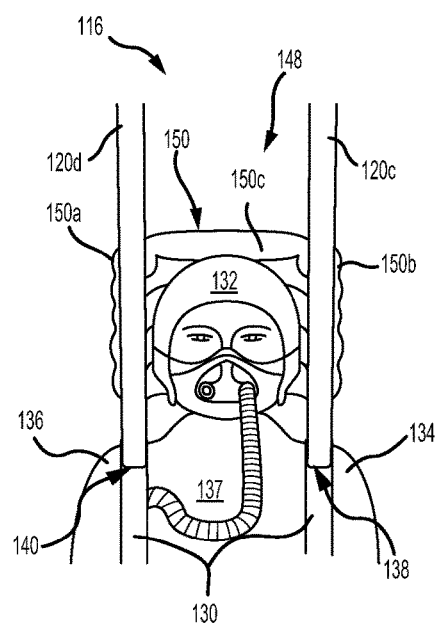
FIG. 4C illustrates a rearward view of the inflatable head restraint of FIG. 4A, in accordance with various embodiments.

FIG. 4C illustrates a rearward view of inflatable head restraint 150 of inflatable head restraint system 148 for parachute assembly 116, in accordance with various embodiments. Left shoulder riser 120a and right shoulder riser 120b have been omitted from FIG. 4C for clarity. With combined reference to FIGS. 4B and 4C, in various embodiments, inflatable head restraint 150 may comprise a "U" shape having a first portion 150a extending rearward from right shoulder riser 120d, a second portion 150b extending rearward from left shoulder riser 120c, and a transverse portion 150c extending between first portion 150a and second portion 150b. In various embodiments, first portion 150a, second portion 150b, and transverse portion 150c are fluidly coupled to one another, such that first portion 150a, second portion 150b, and transverse portion 150c define a single volume, or chamber, of inflatable head restraint 150.

Inflatable head restraint 150 is configured to be located behind (i.e., rearward of) head 132 of occupant 110. The U-shape of inflatable head restraint 150 may allow for increased range of motion of head 132 and/or may allow head 132 to be oriented at a more comfortable angle, while still restricting translation of head 132 rearward to reduce possibility of neck hyperextension. Inflatable head restraint 150 may thus limit rearward translation of head 132 during peak deployment forces to reduce possibility of neck injury, while allowing occupant 110 to have increased head mobility during steady state decent and landing.

Figure 5:
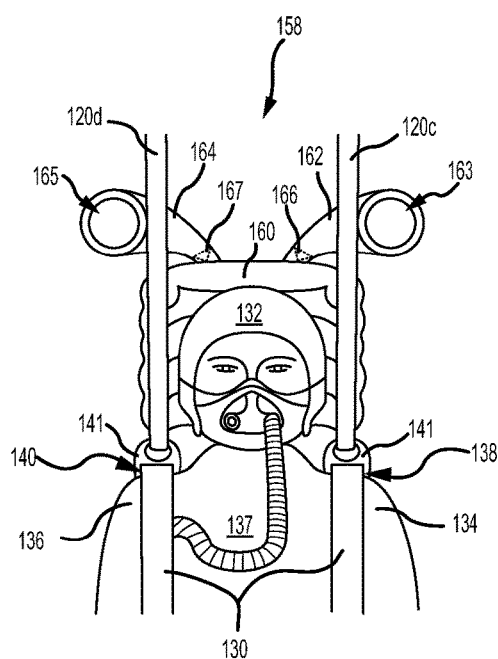
FIG. 5 illustrates a rearward view of an inflatable head restraint of a parachute assembly in a deployed state, in accordance with various embodiments.

With reference to FIG. 5, a rearward view of an inflatable head restraint system 158 in an inflated state is illustrated, in accordance with various embodiments. In various embodiments, parachute assembly 116 may include inflatable head restraint system 158 in place of inflatable head restraint system 148, with momentary reference to FIG. 3. Inflatable head restraint system 158 includes an inflatable volume 160 (referred to herein as "inflatable head restraint" 160) configured to be located rearward of head 132 of occupant 110, upon deployment of the parachute assembly. Inflatable head restraint 160 is configured to limit translation of head 132 in the rearward direction, thereby reducing a likelihood of head and/or neck injury to occupant 110.

In various embodiments, inflatable head restraint 160 may comprise a U-shape, similar to inflatable head restraint 150 in FIGS. 4A, 4B, and 4C. Inflatable head restraint 160 may be coupled to left shoulder riser 120c and right shoulder riser 120d.

In various embodiments, inflatable head restraint system 158 may further include a first conduit 162 and a second conduit 164. First and second conduits 162, 164 are each fluidly coupled to inflatable head restraint 160. First conduit 162 may be coupled to left shoulder riser 120c, such that upon deployment of the parachute assembly, an inlet 163 of first conduit 162 is oriented forward, or in a direction of flight. Second conduit 164 may be coupled to right shoulder riser 120d, such that upon deployment of the parachute assembly, an inlet 165 of second conduit 164 is oriented forward, or in a direction of flight.

In various embodiments, a first one-way valve 166 may be fluidly coupled between inlet 163 and inflatable head restraint 160. A second one-way valve 167 may be fluidly coupled between inlet 165 and inflatable head restraint 160. First one-way valve 166 is configured to allow gas (e.g. ambient air) to flow in a direction from inlet 163 toward an inlet of inflatable head restraint 160, while preventing or reducing gas flow in a direction from the inlet of inflatable head restraint 160 toward inlet 163. Second one-way valve 167 is configured to allow gas (e.g. ambient air) to flow in a direction from inlet 165 toward an inlet of inflatable head restraint 160, while preventing or reducing gas flow in a direction from the inlet of inflatable head restraint 160 toward inlet 165. First and second conduits 162, 164 are configured to inflate inflatable head restraint 160 by directing ambient air into inflatable head restraint 160. In various embodiments, first and second conduits 162, 164 may be used in conjunction with a compressed fluid source (similar to charge tank 152 in FIG. 4A) fluidly coupled to inflatable head restraint 160.

Figure 6A:
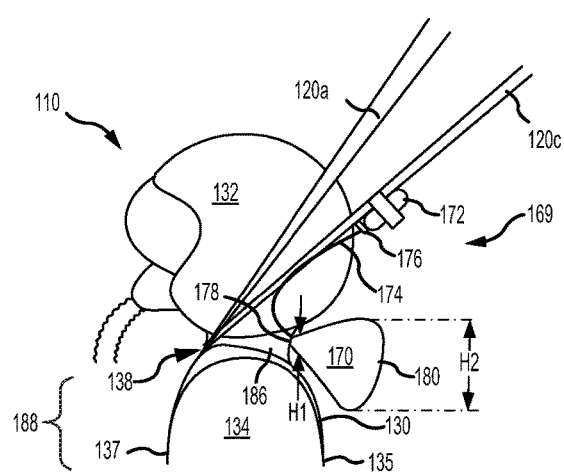
FIG. 6A illustrates a side view of an inflatable head restraint of a parachute assembly in a deployed state, in accordance with various embodiments, in accordance with various embodiments.
Figure 6B:
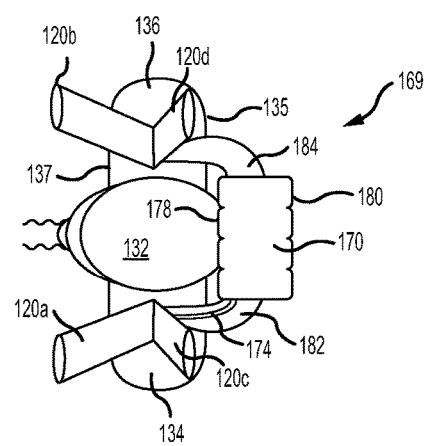
FIG. 6B illustrates a downward view of the inflatable head restraint of FIG. 6A, in accordance with various embodiments.

Referring to FIGS. 6A and 6B, a side view and downward view, respectively, of an inflatable head restraint system 169 are illustrated with the head restraint in an inflated state, in accordance with various embodiments. In various embodiments, parachute assembly 116 may include inflatable head restraint system 169 in place of inflatable head restraint system 148, with momentary reference to FIG. 4A. Inflatable head restraint system 169 includes an inflatable volume 170 (referred to herein as "inflatable head restraint" 170). Inflatable head restraint 170 may be coupled to left shoulder riser 120c via a first strap 182 and to right shoulder riser 120d via a second strap 184. First and second straps 182, 184 may comprise a material similar to left and right shoulder risers 120c, 120d. For example, first and second straps 182, 184 may comprise canvas, nylon webbing, aramid fiber (e.g., KEVLAR®), polyethylene terephthalate, and/or the like. First and second straps 182, 184 may be coupled to inflatable head restraint 170 and to left and right shoulder risers 120c, 120d using any suitable attachment technique, such as, for example, through stitching, adhesive, friction coupling, etc.

In various embodiments, a compressed fluid source, for example, a charge tank 172 is fluidly coupled to inflatable head restraint 170. Charge tank 172 is configured to deliver air and/or other gas into inflatable head restraint 170, upon deployment of the parachute assembly. In this regard, inflatable head restraint 170 may be uninflated, prior to deployment of the parachute assembly.

Charge tank 172 may be fluidly coupled to inflatable head restraint 170 via a conduit 174. In various embodiments, charge tank 172 may be operationally coupled to left shoulder riser 120c, such that charge tank 172 outputs gas to inflatable head restraint 170 in response to a tension of left shoulder riser 120c exceeding a predetermined tension threshold. The increase in tension in left shoulder riser 120c, upon deployment of the parachute assembly, may actuate a valve 176 of charge tank 172 to an open position. In various embodiments, the increase in tension in left shoulder riser 120c may pull a pin, which, when removed (i.e., pulled), actuates valve 176 to the open position. Actuating valve 176 to the open position allows gas to flow from charge tank 172 to inflatable head restraint 170.

In various embodiments, inflatable head restraint 170 may comprise a wedge shape having a generally triangular cross-section. For example, a height H1 of inflatable head restraint 170 at a first end 178 of inflatable head restraint 170 is less than a height H2 of inflatable head restraint 170 at a second end 180 of inflatable head restraint 170. First end 178 of inflatable head restraint 170 is located proximate occupant 110, when the parachute assembly is in the deployed state, and second end 180 of inflatable head restraint 170 is located distal occupant 110 (i.e., opposite first end 178), when the parachute assembly is in the deployed state.

Inflatable head restraint 170 is configured to be located rearward of a neck 186 of occupant 110, and between head 132 and an upper thoracic area 188 of occupant 110. The wedge shape of inflatable head restraint 170 may allow for increased range of motion of head 132 and/or may allow head 132 to be located at a more comfortable angle, while still restricting rearward translation of head 132 and reducing possibilities for hyperextension of neck 186. Inflatable head restraint 170 may thus limit rearward motion of head 132 during peak deployment forces to reduce possibility of neck injury, while allowing occupant 110 to have increased head mobility and comfort during steady state decent and landing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable head restraint system for a parachute assembly, comprising:
   an inflatable volume configured to automatically inflate in response to a deployment of the parachute assembly, wherein the inflatable volume is located between a left shoulder riser and a right shoulder riser of the parachute assembly;
   a first conduit fluidly coupled to the inflatable volume;
   a charge tank fluidly coupled to the inflatable volume via the first conduit; and
   a valve fluidly coupled between an output of the charge tank and the first conduit, wherein the valve is operably coupled to at least one of the left shoulder riser or the right shoulder riser such that the valve actuates to an open position in response to a tension in the at least one of the left shoulder riser or the right shoulder riser exceeding a predetermined tension threshold.

2. The inflatable head restraint system of claim 1, further comprising a pin operably coupled between the valve and the at least one of the left shoulder riser or the right shoulder riser, wherein the at least one of the left shoulder riser or the right shoulder riser is configured to remove the pin from the valve in response to in response to the tension in the at least one of the left shoulder riser or the right shoulder riser exceeding the predetermined tension threshold, and wherein removing the pin from the valve actuates the valve to the open position.

3. The inflatable head restraint system of claim 1, wherein the inflatable volume comprises a U-shape having a transverse section extending between a pair of rearward extending sections.

4. The inflatable head restraint system of claim 1, wherein the inflatable volume comprises a wedge shape having a first height at a first end of the inflatable volume and a second height greater than the first height at a second end of the inflatable volume opposite the first end.

5. The inflatable head restraint system of claim 1, further comprising a first one-way valve fluidly coupled to the first conduit and to a first input of the inflatable volume.

6. The inflatable head restraint system of claim 5, further comprising:
a second conduit fluidly coupled to the inflatable volume; and
a second one-way valve fluidly coupled to the second conduit and to a second input of the inflatable volume.

7. A parachute assembly, comprising
a canopy;
a first suspension line coupled to the canopy;
a first riser coupled to the first suspension line; and
an inflatable head restraint coupled to the first riser, wherein the inflatable head restraint is configured to automatically inflate upon a deployment of the parachute assembly;
a conduit fluidly coupled to the inflatable head restraint;
a charge tank fluidly coupled to the inflatable head restraint via the conduit; and
a valve fluidly coupled between the charge tank and the conduit, wherein the valve is operably coupled to the first riser such that the valve actuates to an open position in response to a tension in the first riser exceeding a predetermined tension threshold.

8. The parachute assembly of claim 7, further comprising:
a second suspension line coupled to the canopy; and
a second riser coupled to the second suspension line, wherein the inflatable head restraint is coupled to the second riser.

9. The parachute assembly of claim 8, wherein the inflatable head restraint comprises:
a first portion extending rearward from the first riser;
a second portion extending rearward from the second riser; and
a transverse portion extending between the first portion and the second portion.

10. The parachute assembly of claim 7, further comprising:
a one-way valve located between an inlet of the conduit and the inflatable head restraint.

11. The parachute assembly of claim 7, wherein the inflatable head restraint is wedge shaped.

12. A parachute assembly for decelerating an occupant of an evacuation seat, comprising:
a left shoulder riser attachable to a harness;
a right shoulder riser attachable to the harness;
an inflatable head restraint located between the right shoulder riser and the left shoulder riser, wherein the inflatable head restraint is configured to automatically inflate upon a deployment of the parachute assembly;
a first conduit fluidly coupled to the inflatable head restraint, wherein the first conduit is coupled to at least one of the left shoulder riser or the right shoulder riser such that, in response to the deployment of the parachute assembly, an inlet of the first conduit is oriented in a direction of flight.

13. The parachute assembly of claim 12, further comprising a second conduit fluidly coupled to the inflatable head restraint, wherein the second conduit is coupled to the right shoulder riser such that, in response to the deployment of the parachute assembly, an inlet of the second conduit is oriented in the direction of flight.

14. The parachute assembly of claim 13, further comprising:
a first one-way valve fluidly coupled between the inlet of the first conduit and a first input of the inflatable head restraint; and
a second one-way valve fluidly coupled between the inlet of the second conduit and a second input of the inflatable head restraint.

15. The parachute assembly of claim 12, wherein the inflatable head restraint comprises:
a first portion extending rearward from the left shoulder riser;
a second portion extending rearward from the right shoulder riser; and
a transverse portion extending between the first portion and the second portion.

16. The parachute assembly of claim 12, wherein the inflatable head restraint is wedge shaped.

* * * * *